United States Patent
Hwang et al.

(10) Patent No.: US 8,275,514 B2
(45) Date of Patent: Sep. 25, 2012

(54) INTELLIGENT VEHICLE SEAT SUPPORT SYSTEM

(75) Inventors: Su Hwan Hwang, Hwaseong-si (KR); Young Gyu Kim, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 583 days.

(21) Appl. No.: 12/511,830

(22) Filed: Jul. 29, 2009

(65) Prior Publication Data

US 2010/0117414 A1    May 13, 2010

(30) Foreign Application Priority Data

Nov. 13, 2008 (KR) .................. 10-2008-0112810

(51) Int. Cl.
*B60N 2/44* (2006.01)
(52) U.S. Cl. ...................... 701/36; 297/284.6
(58) Field of Classification Search .................. None
See application file for complete search history.

(56) References Cited

U.S. PATENT DOCUMENTS

| | | | |
|---|---|---|---|
| 4,634,179 A * | 1/1987 | Hashimoto et al. | 297/284.6 |
| 4,655,505 A * | 4/1987 | Kashiwamura et al. | 297/284.6 |
| 6,873,892 B2 * | 3/2005 | Katz et al. | 701/49 |
| 7,119,671 B2 * | 10/2006 | Frank et al. | 340/457.1 |
| 7,152,920 B2 * | 12/2006 | Sugiyama et al. | 297/284.6 |
| 2003/0230917 A1 * | 12/2003 | Dorfler et al. | 297/284.1 |
| 2005/0082895 A1 * | 4/2005 | Kimmig | 297/452.41 |

FOREIGN PATENT DOCUMENTS

| | | | |
|---|---|---|---|
| DE | 3432871 A1 * | 3/1986 | |
| JP | 2004-16821 A | 1/2004 | |
| JP | 2004-168224 A | 6/2004 | |
| JP | 2007-276680 | * 10/2007 | |
| KR | 1999-0041856 A | 6/1999 | |
| KR | 1999-0052010 A | 7/1999 | |

* cited by examiner

*Primary Examiner* — Michael J. Zanelli
(74) *Attorney, Agent, or Firm* — Morgan, Lewis & Bockius LLP

(57) ABSTRACT

An intelligent vehicle seat support system may include an air storage tank for storing air and supplying the air when needed, a plurality of air cushions disposed in a vehicle seat in contact with a human body, and configured to selectively expand and shrink depending on the air flow, a pressure sensor for measuring air pressure of each air cushion, an air control valve disposed between the air storage tank and the air cushions, and configured to control the air that flows into each of the air cushions, and a control unit for, when a passenger takes the vehicle seat, automatically controlling the air control valve so that it starts injecting air into each of the air cushions, and, when the air pressure of each air cushion is higher than a preset reference value, controlling the air control valve so that it stops injecting air into each air cushion.

12 Claims, 9 Drawing Sheets

INTELLIGENT VEHICLE SEAT SUPPORT SYSTEM

CROSS-REFERENCE TO RELATED APPLICATION

The present application claims priority to Korean Application No. 10-2008-0112810 filed Nov. 13, 2008, the entire contents of which is incorporated herein for all purposes by this reference.

BACKGROUND OF THE INVENTION

1. Field of the Invention

The present invention relates generally to a vehicle seat support system, and, more particularly, to an intelligent vehicle seat support system capable of automatically providing a passenger with a seat form suitable for the passenger although the passenger does not directly control the seat support system.

2. Description of Related Art

In general, seats are installed in a vehicle so that a driver and passengers can use them. Such a seat is fabricated by arranging elastic springs, sponge, etc. on a seat frame typically made of iron material and covering the exterior of the seat with fiber or (synthetic) leather.

Meanwhile, in some cases, such a seat is fabricated using polyurethane foam. In this case, there are problems in that a driver and/or passengers may have poor riding comfort and feel very tired during long distance riding because the material is hard. In contrast, when sponge or the like is excessively used to make a seat soft, there is the problem of the body of a driver or each passenger being easily shaken when a vehicle is driven, thereby also making the driver or the passengers very tired during long distance drive.

Recently, there has been used a scheme of installing air cushions inside the seat covers of a vehicle and controlling the pressure of the air cushions, thereby improving the riding comfort that is felt by a driver and/or passengers in such seats. Air pressure control means applies air pressure to the air cushions and controls the air pressure applied to the air cushions, thereby improving riding comfort.

However, in order to improve riding comfort using air cushions, passengers must directly adjust the air cushions to the forms that are suitable for their physiques. Furthermore, if the postures of passengers are changed while riding after the air cushions have been set to optimal forms by manipulating the air cushion settings, seat forms suitable for the changed postures of passengers can be provided only when the passengers directly manipulate the air cushion settings again.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an intelligent vehicle seat support system, which is capable of automatically providing an optimal condition to a corresponding passenger without requiring the passenger's control, and of providing a changed seat form to the passenger if the posture of the passenger changes while riding.

In an aspect of the present invention, the intelligent vehicle seat support system, may include an air storage tank for storing air and selectively supplying the air, a plurality of air cushions disposed inside portions of a vehicle seat so as to be in contact with a body of a passenger, and configured to selectively expand and shrink depending on inflow and outflow of the air supplied from the air storage tank, a pressure sensor for measuring air pressure in each of the air cushions, an air control valve disposed between the air storage tank and the air cushions, and configured to control an amount of the air that flows from the air storage tank into each of the air cushions, and a control unit for, when the passenger takes the vehicle seat, automatically controlling the air control valve according to the air pressure measured by the pressure sensor, so that the air control valve starts injecting the air into each of the air cushions respectively, and, when the air pressure of each of the air cushions is higher than a first preset reference value (Po), stopping injecting the air into each of the air cushions respectively The intelligent vehicle seat support system may further include a belt buckle sensor for generating a signal to the control unit to determine whether the passenger is sitting in the vehicle seat, wherein the control unit controls the air control valve to discharge the air from the air cushions if the passenger is determined not to sit in the vehicle seat by the signal of the belt buckle sensor.

The control unit may control the air control valve to discharge the air from the air cushions if the passenger is determined not to sit in the vehicle seat.

The first preset reference value (Po) maybe preset based on a change in an air pressure of each of the air cushions in a no-load state.

The air control valve may be controlled by determining a pressure difference ($\Delta P$) between a current pressure value (Pn) and the first preset reference value (Po) in each of the air cushions and determining whether the pressure difference ($\Delta P$) is equal to a reference pressure value (Pi), wherein an intensity control switch may receive a signal of the reference pressure value (Pi) from the passenger, and wherein the control unit determines whether a posture of the passenger has changed based on an air pressure of each of the air cushions while riding, and, if the posture of the passenger is determined to have changed, controls the air control valve so that the air pressure of each of the air cushions is adjusted to the reference pressure value (Pi), A pressure difference ($\nabla P$) between one of the air cushions and the other of the air cushions may be determined, and, if the pressure difference ($\nabla P$) exceeds a second preset reference value (Pe) and a time duration ($\nabla T$) during which the pressure difference ($\nabla P$) is maintained exceeds a preset time period (To), the posture of the passenger is determined to have changed, wherein the second preset reference value (Pe) is higher than the reference pressure value (Pi), wherein the one of the air cushions and the other of the air cushions are symmetrically selected with respect to a vertical axis disposed at a center of the vehicle seat, and wherein the pressure difference ($\nabla P$) between a left-side of the air cushions and a right-side of the air cushions is determined, and, if the pressure difference ($\nabla P$) exceeds the second preset reference value (Pe) and the time duration ($\nabla T$) during which the pressure difference ($\nabla P$) is maintained exceeds the preset time period (To), the posture of the passenger is determined to have changed.

The air control valve may be a piezo valve.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
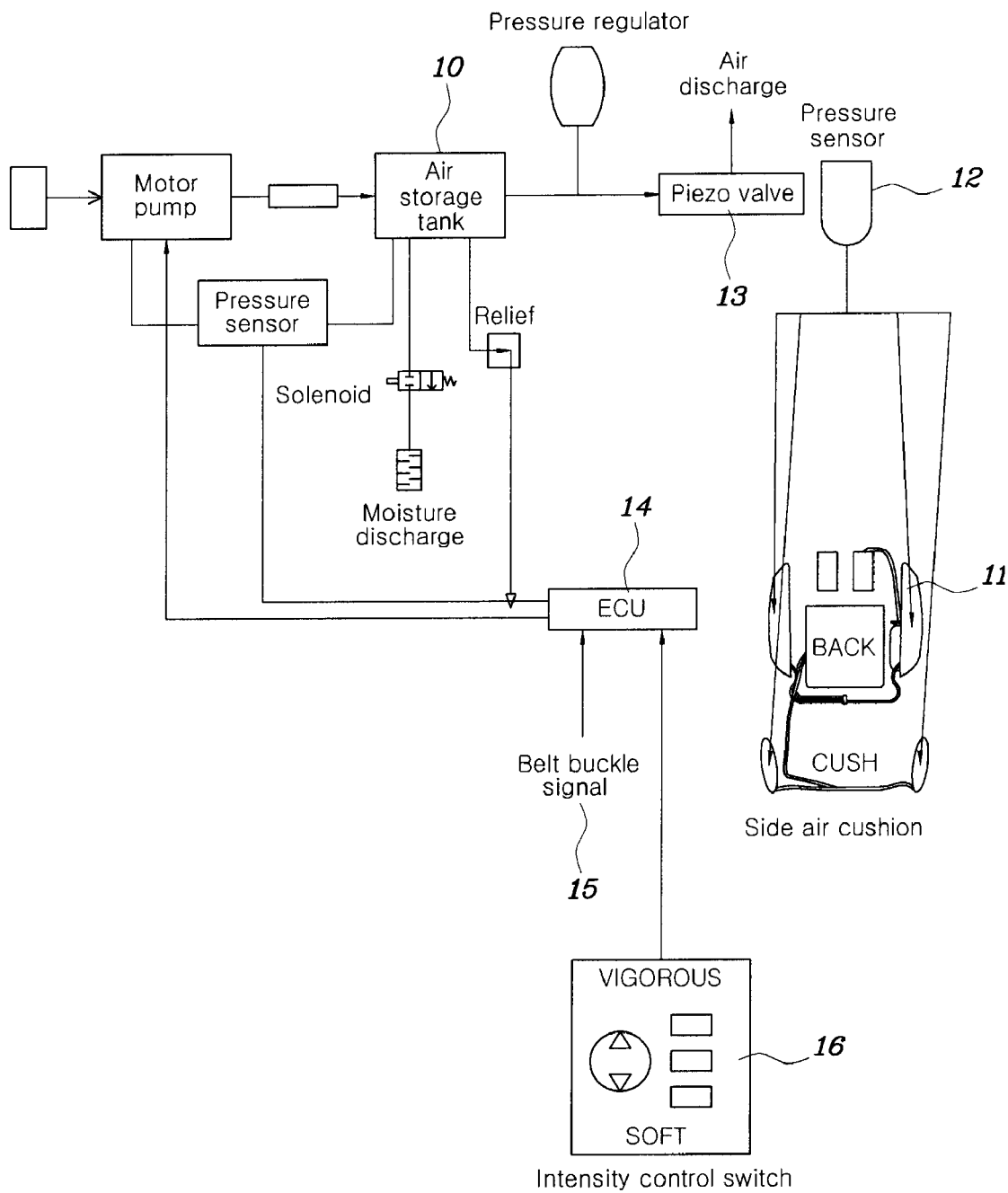
FIG. 1 is a diagram showing the construction of an exemplary vehicle seat support system according to an exemplary embodiment of the present invention.
Figure 2:
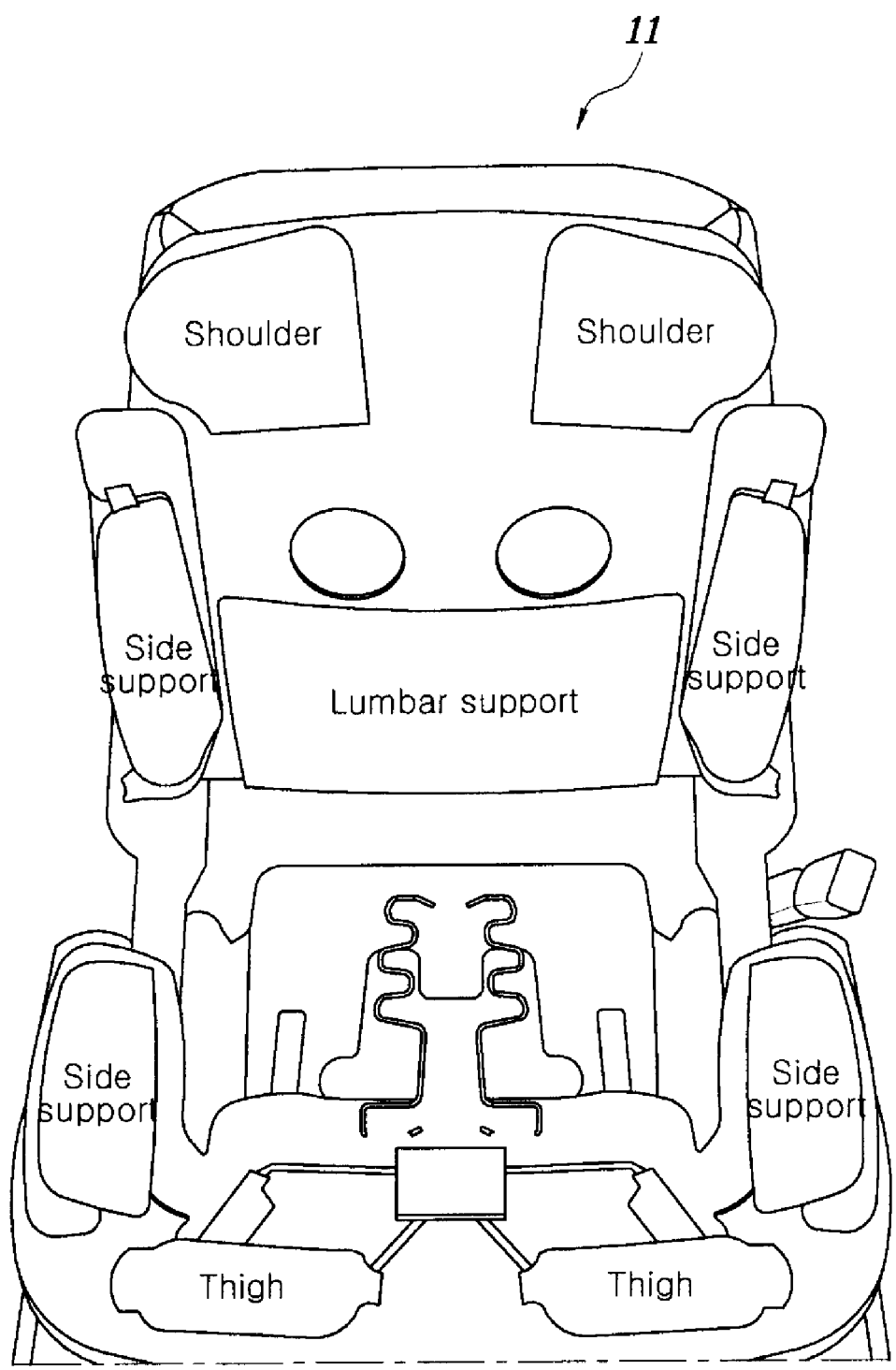
FIG. 2 is a diagram showing an example of the installation of the air cushions of the intelligent vehicle seat support system according to the present invention.
Figure 3:
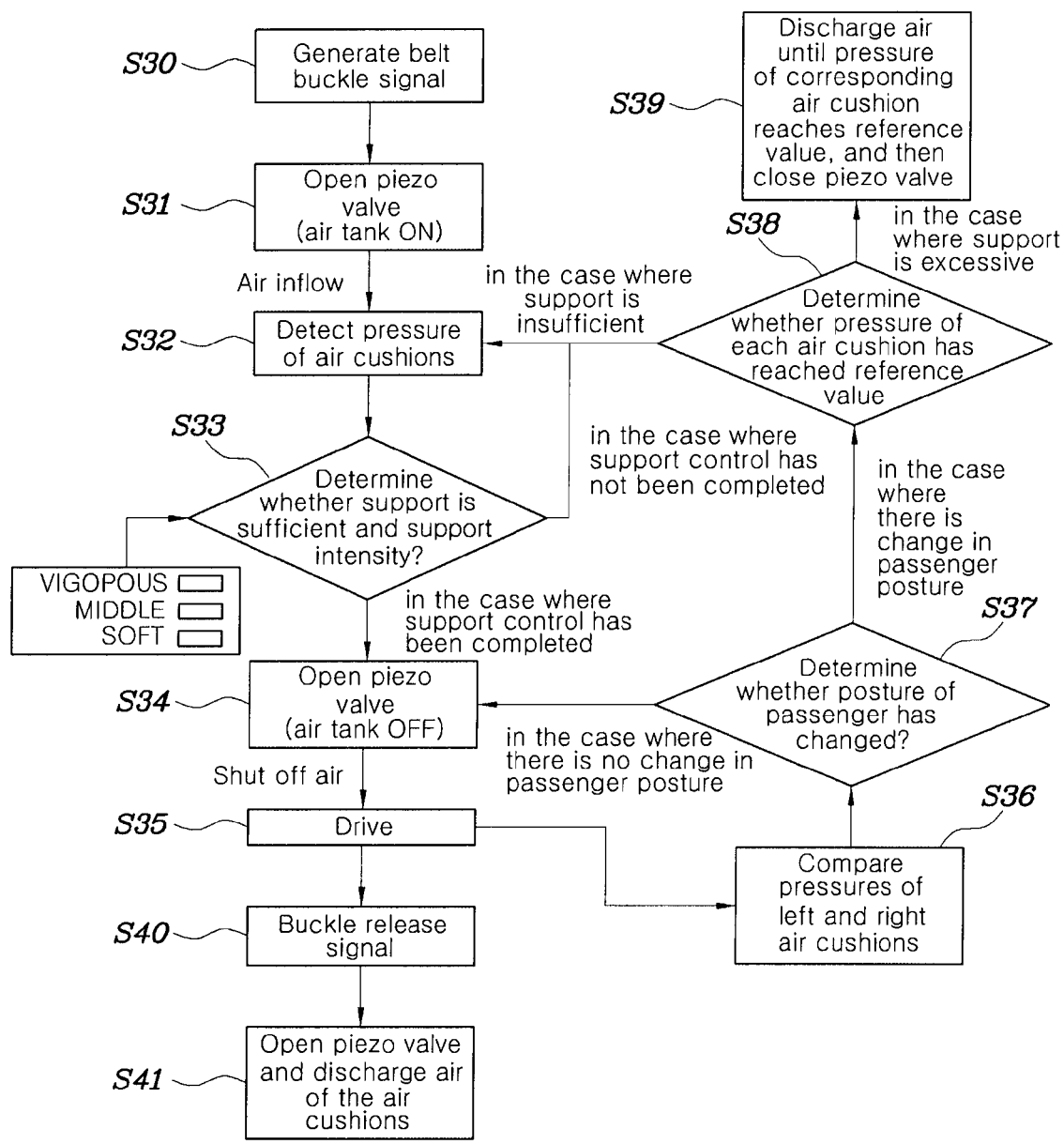
FIG. 3 is a flowchart showing the operation of an exemplary intelligent vehicle seat support system according to the present invention.

FIG. 1 is a diagram showing the construction of a vehicle seat support system according to various embodiments of the present invention. FIG. 2 is a diagram showing an example of the installation of the air cushions of the intelligent vehicle seat support system according to various embodiments of the present invention. FIG. 3 is a flowchart showing the operation of the intelligent vehicle seat support system according to various embodiments of the present invention.

According to various embodiments, after riding on a vehicle, a passenger does not need to directly adjust the pressure of air cushions to values suitable for his or her bodily shape, but the seat support system automatically detects the riding of the passenger on the vehicle and controls the pressure of the air cushions. Furthermore, the seat support system uses a method of controlling the pressure of the air cushions on the basis of the actual stature and weight of a passenger, rather than a method of estimating the stature and weight of a passenger and controlling a seat support on the basis of previously input statistical criteria.

Referring to FIG. 1, the intelligent vehicle seat support system according to various embodiments of the present invention includes an air storage tank 10 for storing air and supplying the stored air if needed, a plurality of air cushions 11 disposed inside the portions of a vehicle seat in contact with a human body and configured to expand or shrink according to the inflow or outflow of the air, and a pressure sensor 12 configured to detect the air pressure of each of the air cushions 11. The air cushions 11 according to various embodiments of the present invention may be installed inside the seat, as shown in FIG. 2.

The intelligent vehicle seat support system further includes an air control valve 13 that is disposed between the air storage tank 10 and the air cushion 11 and configured to control the amount of air that flows into the air cushion 11. The air control valve 13 may be a piezo valve. The intelligent vehicle seat support system further includes a control unit 14 that controls the air control valve 13 so that it automatically starts injecting air into the air cushion 11 when a passenger sits in the seat and so that it stops injecting air into the air cushion 11 when the pressure of the air cushion 11 becomes higher than a preset reference value.

The intelligent vehicle seat support system further includes a belt buckle sensor 15 for generating a signal indicative of whether a passenger is sitting in the seat, and an intensity control switch 16 for receiving a signal related to a change in the reference value from the passenger. The intensity control switch 16 may be configured to include option selection switches (for example, vigorous/middle/soft switches), or may be configured to select sub-divided intensity levels by moving the intensity levels up and down using up and down switches. In this case, the intensity control switch 16 may be configured to be of various types, such as a button type or a touch type.

In the operation of the intelligent vehicle seat support system according to various embodiments, whether a passenger has taken the seat is determined first at step S30, as shown in FIG. 3. Here, when a signal indicative of the fact that the seat belt has been fastened is generated by the belt buckle sensor 15 as described above, the passenger is determined to be sitting in the seat.

If, as a result of the determination at step S30, the passenger is determined to be sitting in the seat at step S30, the air storage tank 10 is operated and the air control valve 13 (for example, a piezo valve) is opened so that air can flow from the air storage tank 10 into the plurality of air cushions 11 at step S31. At step S32, the pressure sensor 12 detects the air pressure of the air cushions 11.

At step S33, whether to continue or stop injecting air into the air cushions 11 is determined by comparing the detected air pressure with a preset reference value. If, as a result of the determination, the injection of air is determined to be continued, the air continues to flow from the air storage tank 10 into the air cushions 11 at step S31. However, if, as a result of the determination, the injection of air is determined to be stopped, the operation of the air storage tank 10 is stopped and the air control valve 13 (for example, a piezo valve) is closed so that the air does not flow from the air storage tank 10 into the plurality of air cushions 11 any longer at step S34.

Thereafter, if the passenger is determined not to be sitting in the seat based on, for example, the buckle release signal of step S40 when in a riding state at step S35, air is discharged from all the air cushions by opening the air control valve 13 (for example, a piezo valve), thereby resetting the air cushions at step S41.

Meanwhile, according to various embodiments, the seat support may be controlled by determining whether the posture of a passenger has changed while riding based on the measured pressure of each of the air cushions. For example, the pressure of the left air cushion of the seat can be compared with the pressure of the right air cushion of the seat at step S36, and then whether the posture of the passenger has changed is determined at step S37. If, as a result of the determination at step S37, the posture of the passenger is determined to have been changed, whether the pressure of each of the air cushions has reached a preset reference value is determined at step S38. If, as a result of the determination at step S38, the pressure of each of the air cushions is determined not to have reached the preset reference value, the process returns to step S31, at which air is injected into each of the air cushions until the pressure of each of the air cushions reaches the preset reference value. In contrast, if, as a result of the determination at step S38, the pressure of each of the air cushions is determined to have exceeded the preset reference value, the process proceeds to step S39, at which air is discharged until the pressure of each of the air cushions reaches the preset reference value and then the air control valve is closed.

Figure 4:
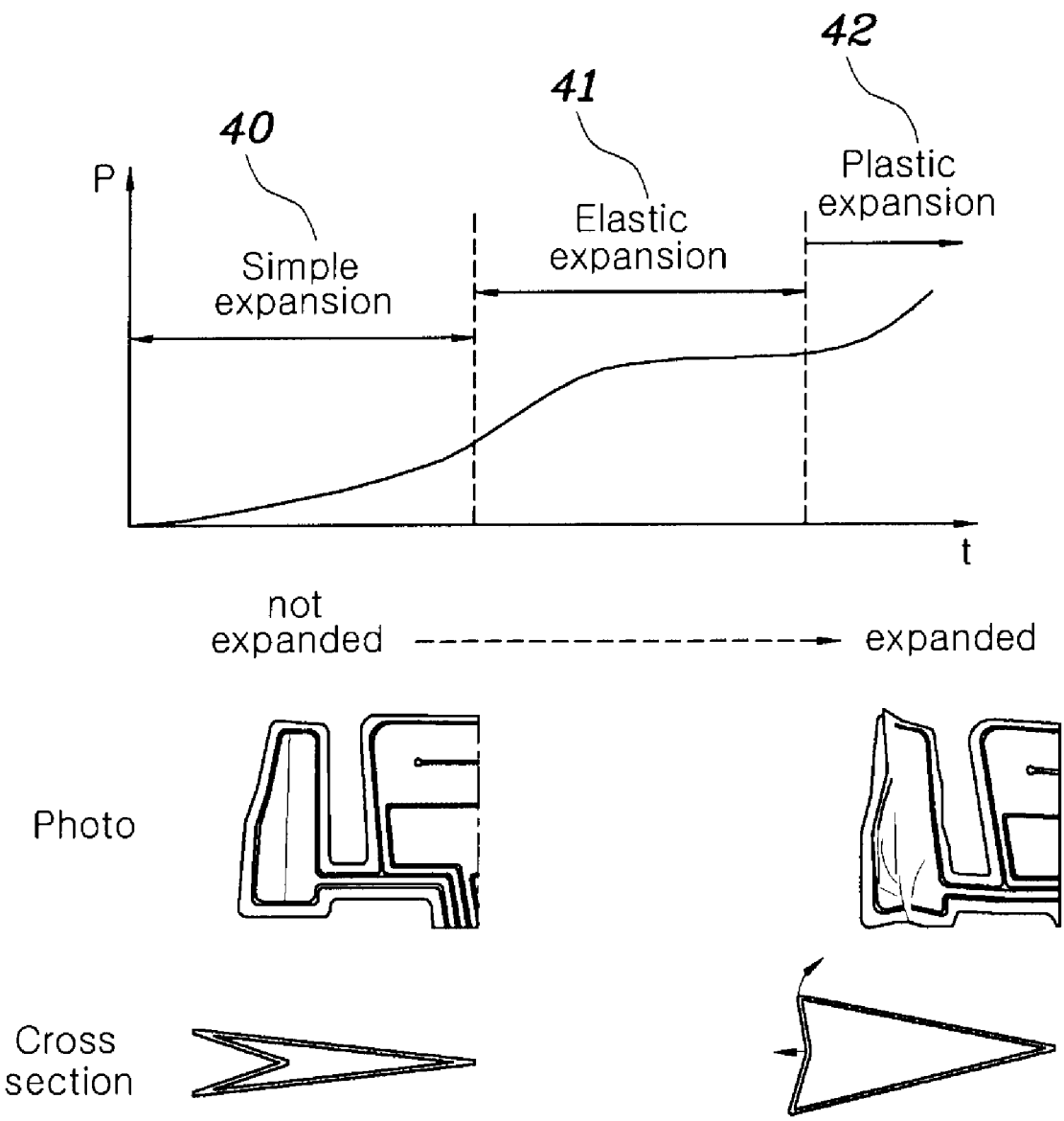
FIG. 4 is a diagram showing an example of setting a reference value for controlling the pressure of each of the air cushions in the intelligent vehicle seat support system according to the present invention.

FIG. 4 is a diagram showing an example of setting a reference value for controlling the pressure of each of the air cushions in the intelligent vehicle seat support system according to various embodiments of the present invention.

According to various embodiments, in the control unit, a reference value (that is, a criterion for determining whether the pressure of each of the air cushions is appropriate or not) is set based on a change in the pressure of each of the air cushions when the air flows in a no-load state.

Assuming that the air uniformly flows per hour, the change in the pressure of each of the air cushions in a no-load state goes through the steps of simple expansion 40, elastic expansion 41, and plastic expansion 42, as shown in FIG. 4. First, the region of simple expansion 40 refers to an interval in which air enters an air cushion having an original shape. The region of elastic expansion 41 refers to an interval in which an air cushion itself expands elastically. The region of plastic expansion 42 refers to an interval in which deformation above the elastic limit of the material of the air cushion occurs. In general, the region of simple expansion 40 and the region of elastic expansion 41 are used for side supports.

According to various embodiments, a reference value, which is a criterion for determining whether the pressure of each of the air cushions is appropriate or not may be set based on the difference between a change in the pressure of each of the air cushions in a no-load state shown in FIG. 4 and a change in the pressure of each of the air cushions in the state in which a passenger is sitting in the seat. Furthermore, the reference value is stored in the memory of the control unit, and is used to control the pressure of each of the air cushions.

Figure 5A:
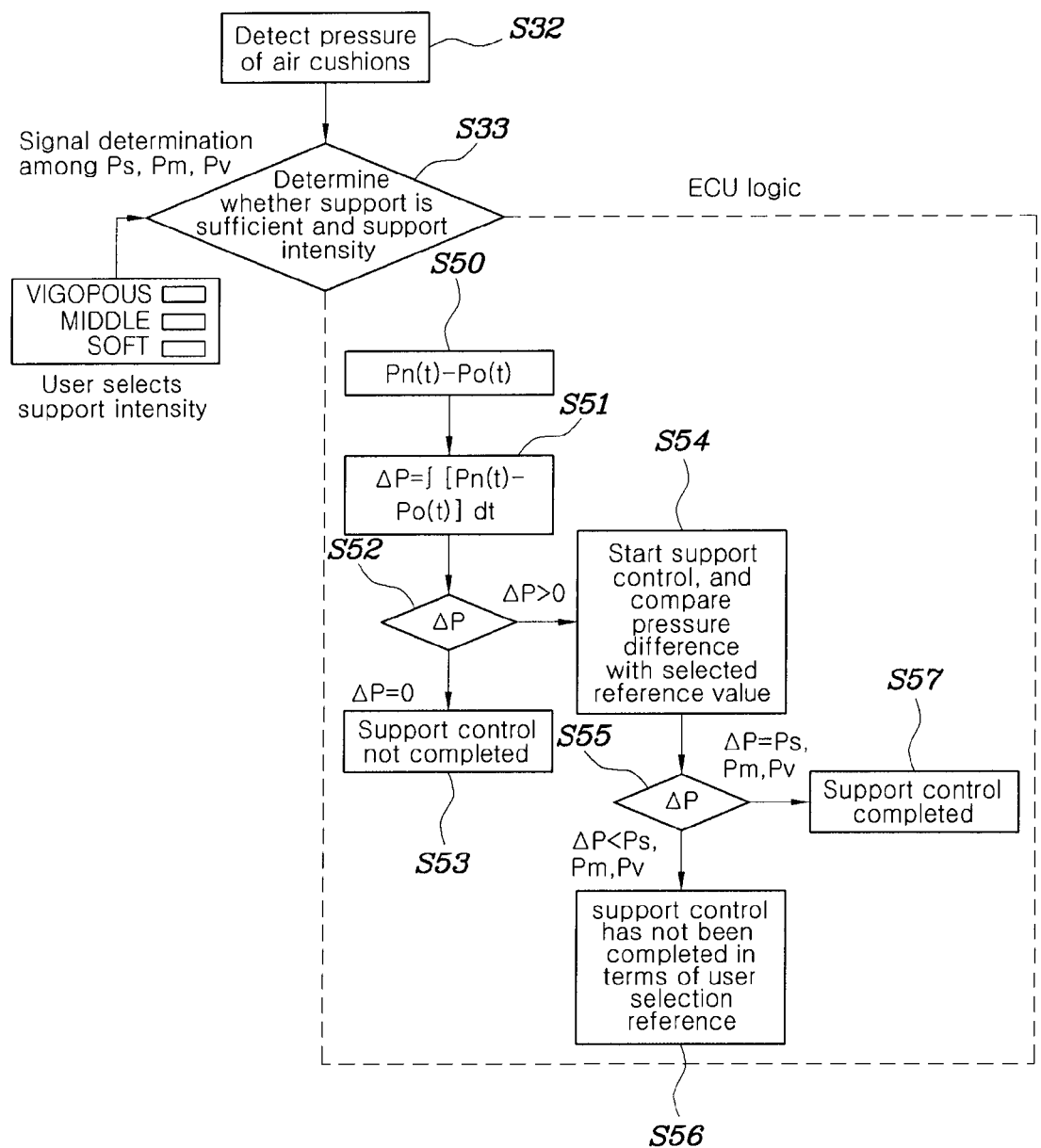
FIGS. 5A to 5C are a views showing an exemplary method of automatically controlling the pressure of air cushions in the intelligent vehicle seat support system according to the present invention.

FIG. 5A is a flowchart showing a method of automatically controlling the pressure of each of air cushions in the intelligent vehicle seat support system according to various embodiments of the present invention.

Figure 5B:
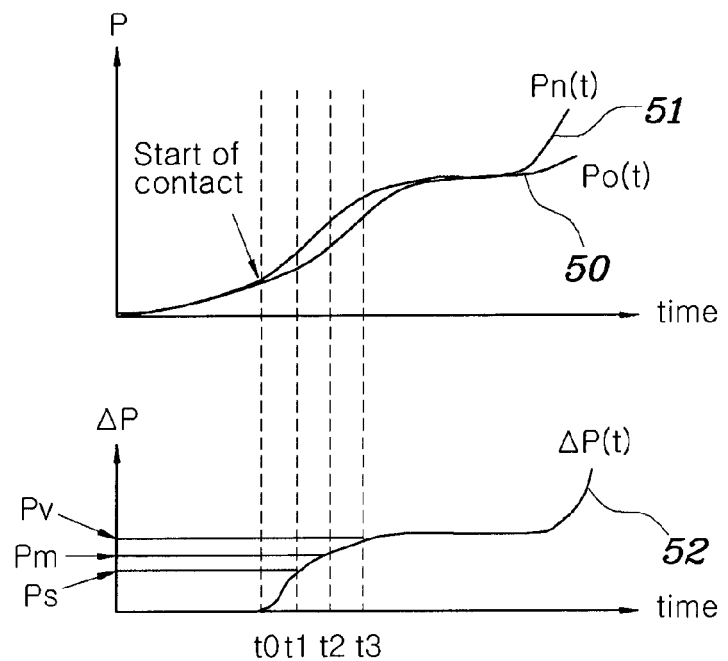

In various embodiments, a method of determining whether to continue or stop injecting air by comparing the detected air pressure with the preset reference value at step S33 of FIG. 3 is described below in more detail. As shown in FIGS. 5A and 5B, at step S50, the difference between a current pressure value Pn (t), which is measured for each of the air cushions, and a reference value Po (t), which has been previously measured in a no-load state and stored in the control unit described above with reference to FIG. 4, is calculated. At step S51, the amount of pressure change ΔP is calculated in real time by integrating the difference value, calculated at step S50, over time.

In FIG. 5B, Pn(t) is a graph showing pressure of air cushions measured by pressure sensor, Po(t) is a graph showing internal pressure of air cushions in a no-load state and ΔP(t) is a graph showing a result of Calculation ΔP(t)=∫[Pn(t)−Po(t)] dt.

At step S52, whether the amount of pressure change ΔP is equal to or greater than 0 is determined. If, as a result of the determination at step S52, the amount of pressure change ΔP is determined to be close to 0 and thus it is considered to be 0 (ΔP=0), support control is determined not to have been completed at step S53, and then the process returns to step S31 of FIG. 3.

In contrast, if, as a result of the determination at step S52, the amount of pressure change ΔP is determined to be greater than 0 (ΔP>0), the amount of pressure change ΔP is compared with the reference value at step S54. Here, the reference value may be set by a user in various manners, as described above.

For example, if a user has selected a soft intensity level, a reference value Ps (a soft reference pressure value) corresponding to the 'soft' level is compared with the amount of pressure change ΔP. If a user has selected a middle intensity level, a reference value Pm (a middle reference pressure value) corresponding to 'middle' level is compared with the amount of pressure change ΔP. If a user has selected a vigorous intensity level, a reference value Pv (a vigorous reference pressure value) corresponding to the 'vigorous' level is compared with the amount of pressure change ΔP.

At step S55, whether the amount of pressure change (ΔP) is smaller than or equal to one of the reference values (Ps, Pm, and Pv), which has been selected by a user, is determined. If, as a result of the determination at step S55, the amount of pressure change ΔP is determined to be smaller than the reference value (ΔP<Ps, Pm or Pv), support control is determined not to have been completed at step S56, and then the process returns to step S31 of FIG. 3. However, if, as a result of the determination at step S55, the amount of pressure change ΔP is determined to be equal to the reference value (ΔP=Ps, Pm or Pv), support control is determined to have been completed at step S57, and then the process returns to step S34 of FIG. 3.

Figure 5C:
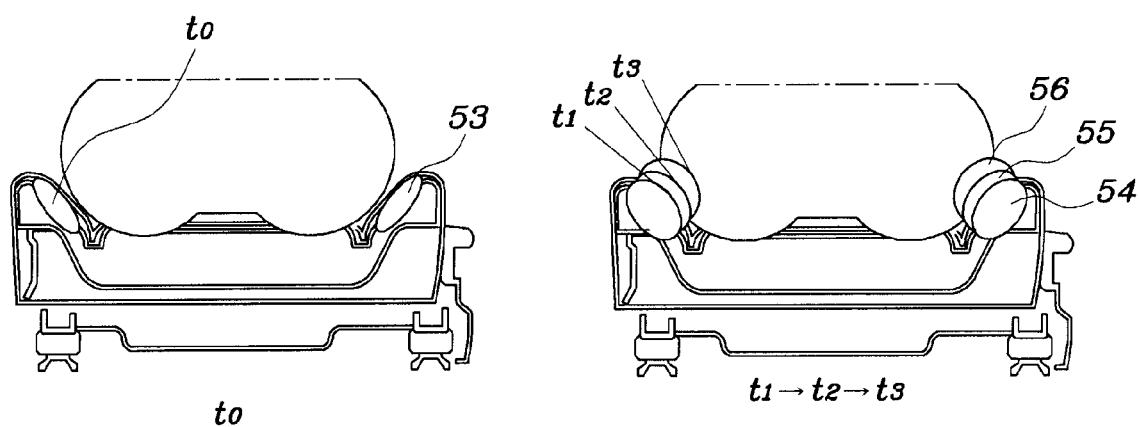

According to various embodiments, as shown in FIG. 5C, when a passenger has taken the seat, the air automatically flows into an air cushion, and the air cushion 53, 54, 55, and 56 expands over time (t0->t1->t2->t3). When a value obtained by detecting the degree of expansion (that is, pressure) of the air cushion reaches a reference value, the injection of the air into the air cushion is automatically stopped. Accordingly, although any passenger may be sitting in the seat, the passenger can feel satisfactorily pleased. Furthermore, such a feeling of satisfaction can be further increased by enabling a passenger to select an intensity level that he considers to be optimal.

Figure 6:
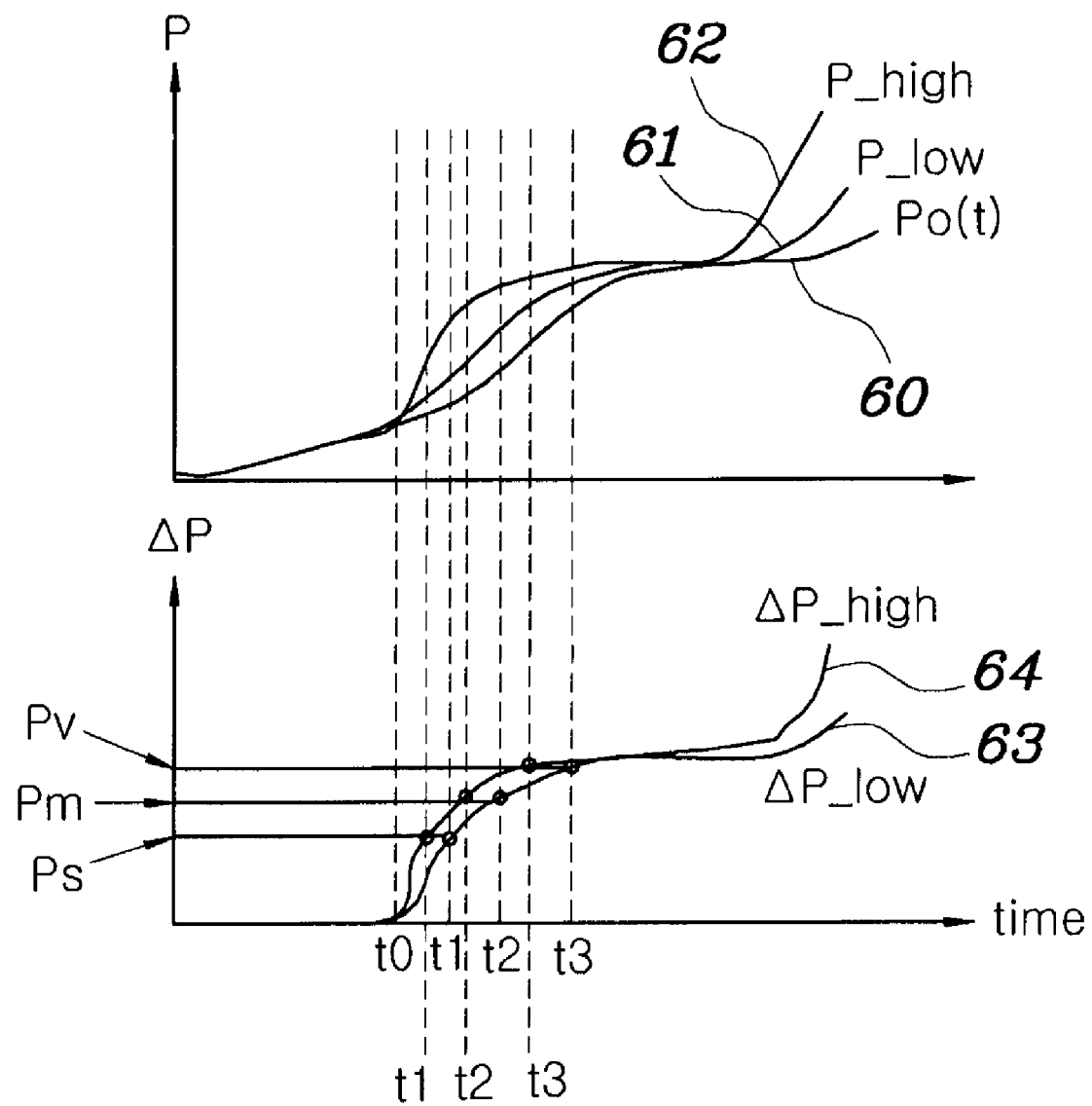
FIG. 6 is a graph showing an exemplary automatic control of the pressure of air cushions for respective body weights of passengers in the intelligent vehicle seat support system according to the present invention.

FIG. 6 is a graph showing the automatic control of the pressure of air cushions for the respective body weights of passengers in the intelligent vehicle seat support system according to various embodiments of the present invention.

When a pneumatic pump and tank having the same performance is used, the pressure of an air cushion with load increases more rapidly than that of an air cushion without load. Furthermore, as the load of an air cushion increases, the pressure of the air cushion with the load enters the region of elastic expansion rapidly (time t1) and the region of plastic expansion rapidly (time t2), compared with the pressure of an air cushion without load.

For example, assume that two persons are of similar shapes and different weights. In this case, from the graph of FIG. 6, it can be seen that the pressure P_high 62 of a person having a heavier weight increases more rapidly than the pressure P_low 61 of a person having a lighter weight. Furthermore, from a graph showing a change in an integral value ΔP_high 64 of a person having a heavier weight and an integral value ΔP_low 63 of a person having a lighter weight, it can be seen that the time that the amount of pressure change for a person having a heavier weight takes to reach a reference value is shorter than that for a person having a lighter weight at a support intensity of ΔP.

Figure 7A:
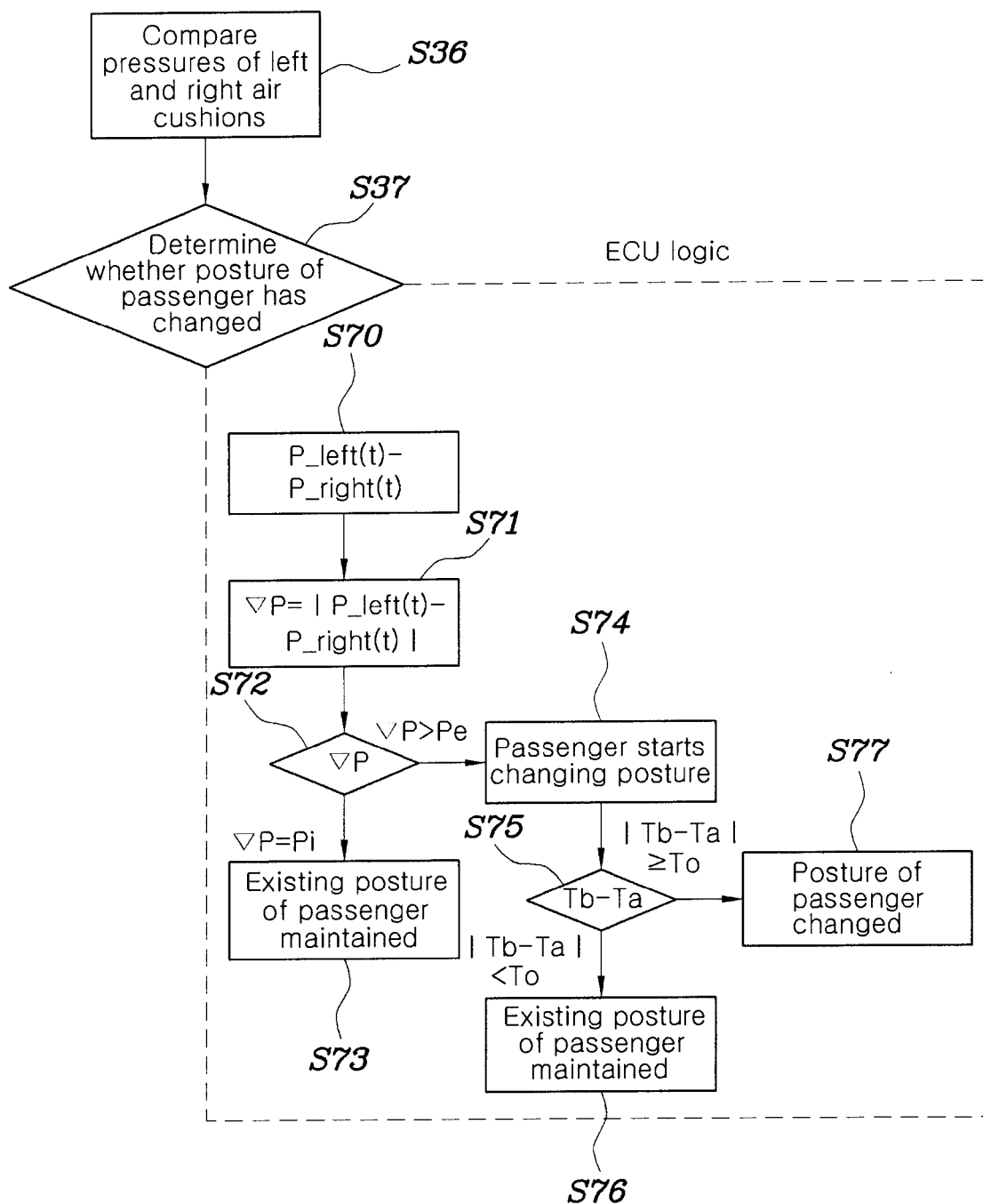
FIGS. 7A and 7B are views showing an exemplary method of automatically controlling the pressure of air cushions while riding in the intelligent vehicle seat support system according to the present invention.

FIG. 7A is a diagram showing a method of automatically controlling the pressure of air cushions while riding in the intelligent vehicle seat support system according to various embodiments of the present invention.

Figure 7B:
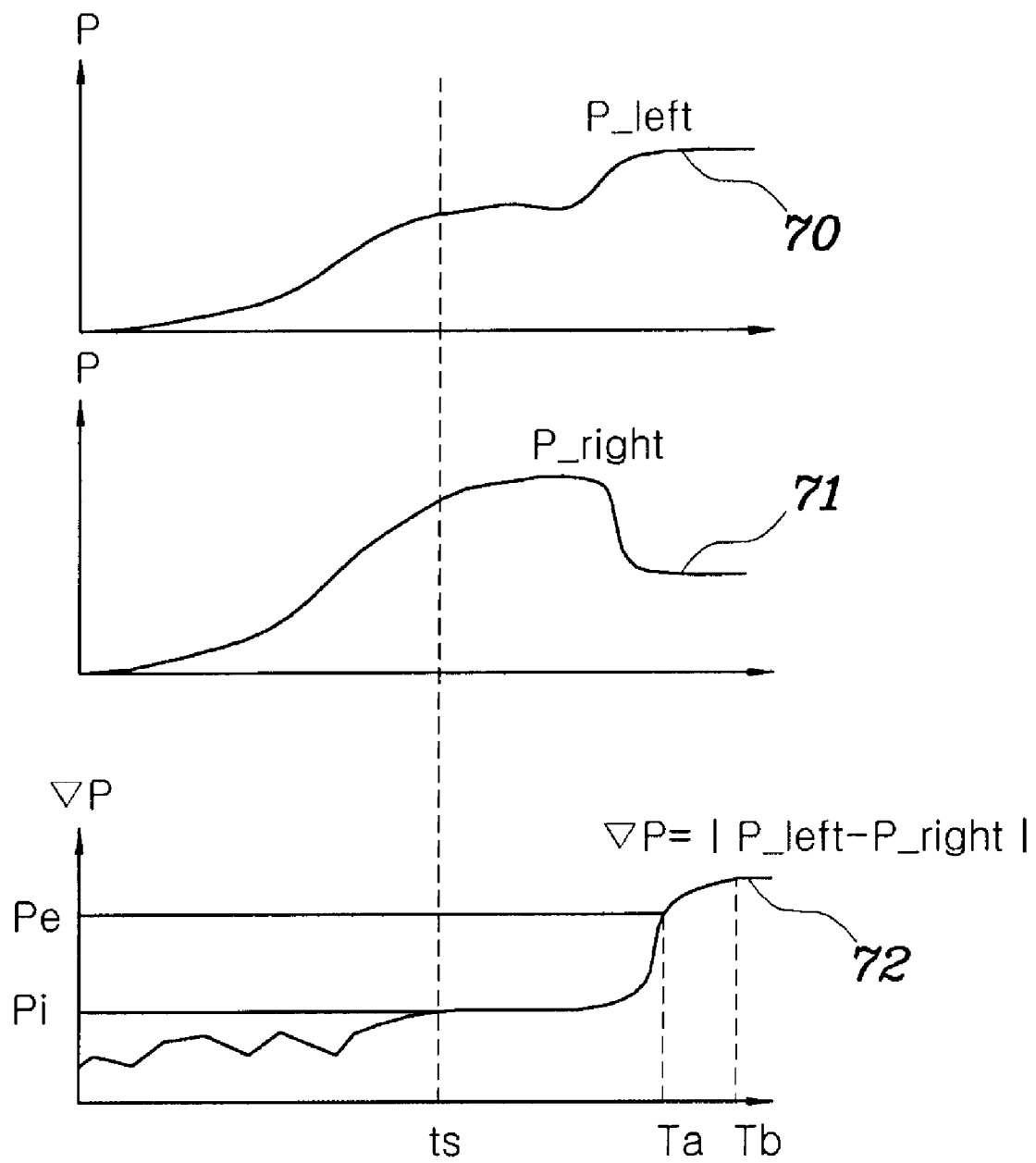

In various embodiments, a method of determining whether the posture of a passenger has changed at step S37 of FIG. 3 is described in more detail. As shown in FIGS. 7A and 7B, at steps S70 and S71, the difference ∇ P between pressure values measured for the respective air cushions, in particular, the difference between the pressure value P_left of a left-side air cushion and the pressure value P_right of a right-side air cushion, is calculated.

At step S72, whether the calculated left/right difference value ∇ P is equal to the pressure difference value Pi (∇ P=Pi) at the time when support control has been completed at step S33 of FIG. 3 or is greater than the reference pressure value Pe that is used to determine the difference between the pressures of the left and right air cushions (∇ P>Pe) is determined. If, as a result of the determination at step S72, the left/right difference value ∇ P is equal to the pressure difference value Pi, the passenger is determined to have maintained the existing posture at step S73, and then the process returns to step S34 of FIG. 3.

However, if, as a result of the determination at step S72, the left/right difference value ∇ P is greater than the reference pressure difference value Pe (∇ P>Pe), the passenger is determined to change his or her posture at step S74. At step S75, a duration ∇ T is calculated by subtracting a time Ta at which the left/right difference value ∇ P starts becoming greater than the reference pressure difference Pe from an interval Tb during which the left/right difference value ∇ P is kept greater than the reference pressure difference Pe.

If, as a result of the calculation at step S75, the duration ∇ T is shorter than a reference duration To (which ensures that the posture of the passenger has changed), the passenger is determined to maintain the existing posture at step S76, and then the process returns to step S34 of FIG. 3. However, if, as a result of the calculation at step S75, the duration ∇ T is equal to or greater than the reference duration To, the passenger is determined to have changed his posture at step S77, and then the process returns to step S38 of FIG. 3.

According to various embodiments, if a passenger who has ridden in a vehicle for a long time asymmetrically changes his posture left or right according to his or her preference, the difference Pi between the pressures of the left and right air cushions has been maintained at a certain level equal to or higher than Pe for a specific period Tb −Ta, as shown in the graph of FIG. 7B. In FIG. 7B, $t_s$ means the time at which initial side support control has been completed.

Accordingly, the control unit starts monitoring the difference Pi between the pressures of the left and right air cushions from the time at which support control is initially completed. If the pressure difference Pi equal to or higher than a specific value is maintained for a period equal to or longer than To, the control unit determines that the posture of the passenger has changed, and performs control so that air is discharged from an air cushion having a higher pressure and air is injected into an air cushion having a lower pressure according to an automatic support algorithm.

According to the present invention, there is an advantage in that, when a passenger rides in a vehicle, support (that is, the pressure of air cushions) can be automatically controlled based on the pressure of the air cushions (for example, side bolsters).

Furthermore, although the existing posture recognition function of a seat is limited only to the independent control of left and right side supports during cornering, the present invention is advantageous in that, even when a passenger changes his posture to the left or right asymmetrically during long riding, it detects such a change and provides an appropriate left or right side support characteristic.

Furthermore, when a seat belt is released, the air cushions are reset (that is, return to their flat state), with the result that there is an advantage in that convenience is offered to a passenger when the passenger gets in and out of a vehicle.

In particular, since the present invention can be implemented using only a pressure sensor connected to a pneumatic valve without an additional sensor, such as a piezoelectric element proposed in the conventional technology, the present invention has an advantage in that it is excellent in terms of cost competitiveness.

For convenience in explanation and accurate definition in the appended claims, the terms "left", "right" and "internal" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An intelligent vehicle seat support system, comprising:
    an air storage tank for storing air and selectively supplying the air;
    a plurality of air cushions disposed inside portions of a vehicle seat so as to be in contact with a body of a passenger, and configured to selectively expand and shrink depending on inflow and outflow of the air supplied from the air storage tank;
    a pressure sensor for measuring air pressure in each of the air cushions;
    an air control valve disposed between the air storage tank and the air cushions, and configured to control an amount of the air that flows from the air storage tank into each of the air cushions; and
    a control unit for, when the passenger takes the vehicle seat, automatically controlling the air control valve according to the air pressure measured by the pressure sensor, so that the air control valve starts injecting the air into each of the air cushions respectively, and, when the air pressure of each of the air cushions is higher than a first preset reference value (Po), stopping injecting the air into each of the air cushions respectively,
    wherein the control unit controls the air control valve to discharge the air from the air cushions if the passenger is determined not to sit in the vehicle seat.

2. The intelligent vehicle seat support system as set forth in claim 1, further comprising a belt buckle sensor for generating a signal to the control unit to determine whether the passenger is sitting in the vehicle seat.

3. The intelligent vehicle seat support system as set forth in claim 2, wherein the control unit controls the air control valve to discharge the air from the air cushions if the passenger is determined not to sit in the vehicle seat by the signal of the belt buckle sensor.

4. The intelligent vehicle seat support system as set forth in claim 1, wherein the first preset reference value (Po) is preset based on a change in an air pressure of each of the air cushions in a no-load state.

5. The intelligent vehicle seat support system as set forth in claim 1, wherein the air control valve is controlled by determining a pressure difference ($\Delta P$) between a current pressure value (Pn) and the first preset reference value (Po) in each of the air cushions and determining whether the pressure difference ($\Delta P$) is equal to a reference pressure value (Pi).

6. The intelligent vehicle seat support system as set forth in claim 5, further comprising an intensity control switch for receiving a signal of the reference pressure value (Pi) from the passenger.

7. The intelligent vehicle seat support system as set forth in claim 5, wherein the control unit determines whether a posture of the passenger has changed based on an air pressure of each of the air cushions while riding, and, if the posture of the passenger is determined to have changed, controls the air control valve so that the air pressure of each of the air cushions is adjusted to the reference pressure value (Pi).

8. The intelligent vehicle seat support system as set forth in claim 7, wherein a pressure difference ($\nabla P$) between one of the air cushions and the other of the air cushions is determined, and, if the pressure difference ($\nabla P$) exceeds a second preset reference value (Pe) and a time duration ($\nabla T$) during which the pressure difference ($\nabla P$) is maintained exceeds a preset time period (To), the posture of the passenger is determined to have changed.

9. The intelligent vehicle seat support system as set forth in claim 8, wherein the second preset reference value (Pe) is higher than the reference pressure value (Pi).

10. The intelligent vehicle seat support system as set forth in claim 8, wherein the one of the air cushions and the other of the air cushions are symmetrically selected with respect to a vertical axis disposed at a center of the vehicle seat.

11. The intelligent vehicle seat support system as set forth in claim 8, wherein the pressure difference ($\nabla P$) between a left-side of the air cushions and a right-side of the air cushions is determined, and, if the pressure difference ($\nabla P$) exceeds the second preset reference value (Pe) and the time duration ($\nabla T$) during which the pressure difference ($\nabla P$) is maintained exceeds the preset time period (To), the posture of the passenger is determined to have changed.

12. The intelligent vehicle seat support system as set forth in claim 1, wherein the air control valve is a piezo valve.

\* \* \* \* \*